US012782617B2

(12) United States Patent
Hansson

(10) Patent No.: US 12,782,617 B2
(45) Date of Patent: Nov. 3, 2026

(54) FABRICATION OF OPTICAL GRATINGS USING A RESIST CONTOURED BASED ON GREY-SCALE LITHOGRAPHY

(71) Applicant: NIL Technology ApS, Kongens Lyngby (DK)

(72) Inventor: Niklas Hansson, Askim (SE)

(73) Assignee: NIL Technology ApS, Kongens Lyngby (DK)

( * ) Notice: Subject to any disclaimer, the term of this patent is extended or adjusted under 35 U.S.C. 154(b) by 271 days.

(21) Appl. No.: 18/289,319

(22) PCT Filed: May 4, 2022

(86) PCT No.: PCT/EP2022/061943

§ 371 (c)(1),
(2) Date: Nov. 2, 2023

(87) PCT Pub. No.: WO2022/233918

PCT Pub. Date: Nov. 10, 2022

(65) Prior Publication Data

US 2024/0230969 A1 Jul. 11, 2024

Related U.S. Application Data

(60) Provisional application No. 63/184,951, filed on May 6, 2021.

(51) Int. Cl.
*G02B 5/18* (2006.01)

(52) U.S. Cl.
CPC ......... *G02B 5/1857* (2013.01); *G02B 5/1823* (2013.01)

(58) Field of Classification Search
None
See application file for complete search history.

(56) References Cited

U.S. PATENT DOCUMENTS

| | | | | |
|---|---|---|---|---|
| 10,534,115 | B1 | 1/2020 | Calafiore et al. | |
| 10,649,141 | B1 | 5/2020 | Colburn et al. | |
| 10,823,888 | B1 | 11/2020 | Evans et al. | |
| 2003/0064295 | A1 | 4/2003 | Yasuyuki et al. | |
| 2004/0223156 | A1 | 11/2004 | McGrew et al. | |
| 2007/0190793 | A1* | 8/2007 | Tzu | G03F 1/30 438/720 |

(Continued)

FOREIGN PATENT DOCUMENTS

| | | |
|---|---|---|
| CN | 106990461 | 7/2017 |
| JP | H1020106 | 1/1998 |

(Continued)

OTHER PUBLICATIONS

Communication pursuant to Article 94(3) EPC in European Appln. No. 22728348.8, mailed on Mar. 3, 2025, 6 pages.

(Continued)

*Primary Examiner* — Ryan Crockett
(74) *Attorney, Agent, or Firm* — Fish & Richardson P.C.

(57) ABSTRACT

The present disclosure describes techniques for fabricating optical elements such as gratings using a resist that can be contoured to have a specified number of grey-scale levels. Optical elements such as gratings, as well as masters that can be used to replicate sub-masters or the optical elements, are described as well.

17 Claims, 3 Drawing Sheets

(56) References Cited

U.S. PATENT DOCUMENTS

| | | | | |
|---|---|---|---|---|
| 2014/0175045 | A1* | 6/2014 | Zhu | G02B 5/1857 216/11 |
| 2017/0211923 | A1* | 7/2017 | Speckbacher | G01B 9/02034 |
| 2018/0017806 | A1 | 1/2018 | Wang et al. | |
| 2019/0258008 | A1 | 8/2019 | Hautala et al. | |
| 2019/0324176 | A1* | 10/2019 | Colburn | G02B 27/0172 |
| 2020/0124865 | A1* | 4/2020 | Meyer Timmerman Thijssen | G02B 5/1819 |
| 2020/0150325 | A1* | 5/2020 | Olson | G02B 5/1857 |
| 2020/0192009 | A1* | 6/2020 | Evans | H01L 21/3065 |
| 2020/0192010 | A1* | 6/2020 | Olson | C23C 14/562 |
| 2020/0271850 | A1 | 8/2020 | Vora et al. | |
| 2020/0326621 | A1* | 10/2020 | Godet | G02B 6/34 |
| 2020/0332414 | A1* | 10/2020 | Guo | C23C 16/045 |
| 2021/0141131 | A1* | 5/2021 | Evans | G02B 5/1828 |
| 2022/0100078 | A1* | 3/2022 | Zeeshan | G03F 1/36 |
| 2023/0058578 | A1* | 2/2023 | Goswami | G21K 1/067 |
| 2023/0064550 | A1* | 3/2023 | Hsu | G02B 6/30 |
| 2025/0076550 | A1* | 3/2025 | Aho | G02B 5/1857 |

FOREIGN PATENT DOCUMENTS

| | | |
|---|---|---|
| JP | 2005331869 | 12/2005 |
| WO | WO 2008005872 | 1/2008 |
| WO | WO 2010094441 | 8/2010 |
| WO | WO 2018220270 | 12/2018 |
| WO | WO 2018220272 | 12/2018 |
| WO | WO 2020264198 | 12/2020 |

OTHER PUBLICATIONS

International Preliminary Report on Patentability in International Appln. No. PCT/EP2022/061943, mailed on Nov. 16, 2023, 8 pages.

International Search Report and Written Opinion in International Appln. No. PCT/EP2022/061943, mailed on Aug. 29, 2022, 13 pages.

Levola et al., "Replicated slanted gratings with a high refractive index material for in and outcoupling of light," Optics Express, Mar. 5, 2007, 15(5):2067-74.

* cited by examiner

FABRICATION OF OPTICAL GRATINGS USING A RESIST CONTOURED BASED ON GREY-SCALE LITHOGRAPHY

CROSS-REFERENCE TO RELATED APPLICATIONS

This application is a National Stage application under 35 U.S.C. § 371 of International Application No. PCT/EP2022/061943, filed on May 4, 2022, which claims the benefit of priority from U.S. Provisional Patent Application No. 63/184,951, filed on May 6, 2021, the contents and disclosures of which are incorporated herein by reference in their entirety.

FIELD OF THE DISCLOSURE

The present disclosure relates to optical gratings.

BACKGROUND

Diffraction gratings are periodic structures that diffract light in only a certain number of discrete directions. Slanted gratings, for example, are a form of line gratings, where the profile of each line is tilted. In some cases, an advantage provided by slanted gratings is that by a proper choice of dimensions, tilt angle and material, a significant percentage of the light can be directed into a single diffraction order. Thus, slanted gratings are sometimes used for coupling light into optical light guides due to their high efficiency in a certain diffraction order.

Slanted gratings can be used, for example, in applications where efficient redirecting of light is important. An example application of slanted gratings is for transparent waveguides in augmented and mixed reality (AR/MR) head mounted displays, where light from an image generator is coupled into the waveguide at one end and coupled out of the waveguide and directed to the eye of the observer at the other end. The gratings act as high efficiency in- and out-coupling gratings.

In addition to waveguides, slanted gratings may be used in other applications, for example, where high efficiency of a single diffraction order is desired.

SUMMARY

The present disclosure describes techniques for fabricating optical elements such as gratings using a resist that can be contoured to have a specified number of grey-scale levels.

For example in one aspect, the present disclosure describes an apparatus that includes an optical grating formed in a substrate having trenches therein. Each of the trenches has a respective trench depth that differs from the respective depths of at least some of the other trenches. The substrate has different regions, wherein each of the regions contains multiple ones of the trenches, and wherein the trenches in each particular one of the regions have substantially the same depth as one another. Each particular one of the regions contains trenches having a depth that differs from a depth of the trenches in an adjacent region.

Some implementations include one or more of the following features. For example, collectively, the trench depths can define grey-scale steps. In some instances, the trenches are slanted with respect to a surface of the substrate. The substrate can be composed, for example, of silicon. In some instances, the trench depths increase or decrease in multiple directions.

The present disclosure also describes a method of manufacturing an optical grating or a master for replicating optical gratings. The method includes providing a resist layer over a substrate that has a surface on which is disposed a grating mask, and processing the resist layer to have a contour that has discrete, non-continuous steps in its surface. The method also includes subsequently performing at least one etch so as to etch the resist layer and the substrate. Etching the substrate forms trenches in the substrate, wherein respective depths of the trenches correspond to the discrete, non-continuous steps in the surface of the resist layer.

Some implementations include one or more of the following features. For example, in some implementations, the resist layer is composed of an e-beam resist, wherein processing the resist layer includes exposing the resist using e-beam lithography. In some instances, exposing the resist using e-beam lithography includes exposing different areas of the e-beam resist with different exposure doses. In some implementations, the at least one etch includes reactive ion beam etching.

In some cases, the resist layer is composed of a photoresist, wherein processing the resist layer includes exposing the resist using a direct laser writer. Exposing the resist using a direct laser writer can include, for example, exposing different areas of the photoresist to different exposure levels. In some instances, the at least one etch includes reactive ion beam etching.

In some implementations, the method further includes, prior to providing the resist layer over the substrate, depositing an intermediate layer on the grating mask and on exposed portions of the substrate surface. In some cases, the resist layer is deposited on the intermediate layer, and the at least one etch includes a first etch and a different subsequent second etch. In some instances, the intermediate layer is composed of $SiO_2$, and the second etch includes reactive ion beam etching. In some instances, the first etch includes a $NF_3$-based etch. In some cases, the substrate is composed, for example, of silicon.

In some implementations, the method includes separating the substrate into individual optical gratings, each of which has a plurality of slanted trenches. In some implementations, the method includes using the substrate having the trenches therein as a master in a replication process to form at least one sub-master or optical grating.

In some implementations, the techniques described in accordance with this disclosure can provide enhanced flexibility in the grating design.

Other aspects, features and advantages will be readily apparent from the following detailed description, the accompanying drawings, and the claims.

DETAILED DESCRIPTION

The present disclosure describes techniques for fabricating slanted gratings using a resist that can be contoured to have a specified number of grey-scale levels. As described in greater detail below, resist is provided over a substrate (e.g., a grating material) that has a grating mask on its surface. Depending on the type of resist used, the resist is contoured, for example, by electron-beam lithography or using a direct laser writer, and subsequently the grating is etched into the substrate.

Figure 1A:
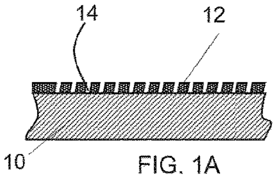
FIGS. 1A-1F illustrate a first method for fabricating slanted gratings using a grey-scale resist.

FIGS. 1A through 1F illustrate examples of steps in a first method for fabricating slanted gratings using a grey-scale resist. As shown in FIG. 1A, a grating mask 12 is deposited on the surface of a grating material substrate 10. The substrate 10 can be composed, for example, of silicon, although other materials may be used in some implementations. The mask 12 can be composed, for example, of $Al_2O_3$, although other materials may be used in some implementations. The mask 12 serves to define where the trenches for the grating(s) are subsequently etched into the substrate 10.

Figure 1B:
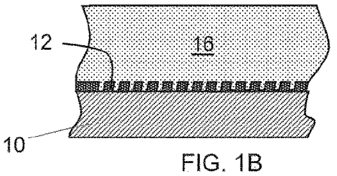

Next, as shown in FIG. 1B, the mask 12 and the exposed parts 14 of the substrate surface are coated with a resist 16 that is capable of being contoured so as to form multiple discrete steps in the surface of the resist 16. In some implementations, the resist 16 is an e-beam resist.

The e-beam resist 16 can be deposited, for example, by spin coating, although other techniques may be appropriate for some implementations. One example of a resist 16 that is commonly used for grayscale electron beam lithography is PMMA (polymethyl methacrylate), which after exposure can be developed, for example, in a mixture of 1:2 H2O/IPA. Other examples of resists that can be used for the e-beam resist 16 are copolymer resists, which are composed of copolymers based on methyl methacrylate and methacrylic acid.

Figure 1C:
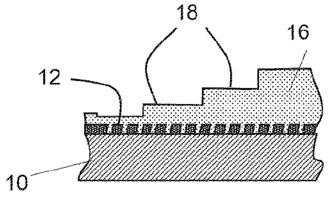

As shown in FIG. 1C, if the resist 16 is an e-beam resist, the resist 16 is exposed to an e-beam and then developed to contour the resist based, for example, on a desired grating structure. Electron-beam lithography (sometimes abbreviated as e-beam lithography or EBL) involves an exposing process, which includes scanning a focused beam of electrons to draw a custom shape on a surface covered with an electron-sensitive film, in this case, the e-beam resist 16. The electron beam changes the solubility of the e-beam resist 16, enabling selective removal of either the exposed or non-exposed regions of the resist by immersing it in a solvent (i.e., developing the resist).

An advantage of e-beam lithography is that it can draw custom patterns by direct-writing with very small resolution. For example, in some cases, the spot size of the e-beam may be as small as 10 nm. However, steps 18 much larger than this size can be created in the resist 16. In general, the e-beam is cable of delivering a finite number of different grey levels or doses (e.g., 256), where a dose corresponds to a particular amount of charge per area. By varying the e-beam dose delivered to different regions across the surface of the resist 16, the resist 16 can be contoured such that there are discrete steps 18 formed in the surface of the resist 16 after it is developed. That is, the transition between adjacent steps 18 is non-continuous.

In some implementations, instead of an e-beam resist, the resist 16 is a photoresist, and a direct laser writer is used to contour the photoresist. In contrast to e-beam lithography, a laser writer may be able, in some instances, to provide an even higher number of grey levels (e.g., on the order of 1,000). Thus, using a laser writer to expose the photoresist, the resist can be contoured such that there are discrete steps formed in its surface after it is developed (i.e., such that the transition between adjacent steps 18 is non-continuous).

Figure 1D:
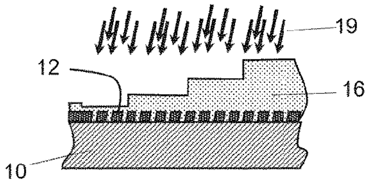
Figure 1E:
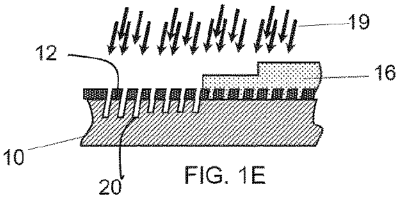
Figure 1F:
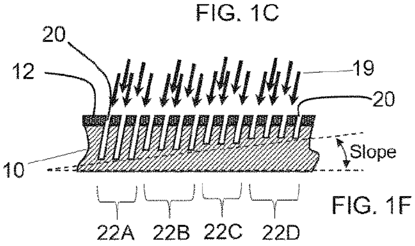

As shown in FIGS. 1D, 1E, 1F, after the resist 16 is contoured to have multiple different discrete steps 18, the grating structure is etched, for example, using reactive ion-beam etching. As the etching process proceeds, the resist 16 is etched at a substantially uniform rate by the ion beam 19. As the etching continues, the discrete (non-continuous) steps 18 are transferred into the grating material. The mask 12, however, is to some extent resistant to the etching. Thus, as the etching proceeds into the substrate 10 (FIGS. 1E and 1F), the presence of the mask 12 results in trenches 20 being formed in the substrate 10. The respective depths of the trenches 20 corresponds inversely to the height of the resist 16. That is, in an area 22A of the substrate 10 where there was a relatively thin layer of resist 16 prior to the etching, the trenches 20 will be relatively deep. Conversely, in an area 22D of the substrate 10 where was a relatively thick layer of resist 16 prior to the etching, the trenches 20 will be relatively shallow. Other areas 22B, 22C of the substrate 10 may have trenches 20 whose depth is intermediate between the depth of the trenches in areas 22A, 22D. The different depths correspond to the finite number of grey-scale steps created in the resist 16 as a result of the greyscale e-beam or laser lithography. The grey-scale steps corresponding to the different depths of the trenches can be contrasted with the substantially continuous slope that typically results, for example, using a shutter technique (see "slope" in FIG. 1F).

As an example, using an e-beam resist and 256 different e-beam dose levels for a 2 cm grating can result in steps 18 in the resist 16 that are about 78 microns wide. In some instances, the height of the grating is in the range of 100-700 nm and the trenches are on the order of 200 nm wide, with a pitch of about 100-1500 nm. As the maximum number of different trench depths corresponds to the maximum number of grey levels (e.g., e-beam doses), some implementations can have at least 52 trenches per grey level.

As another example, using a laser writer can provide a higher number of of grey levels (e.g., 1,000), which in some instances can result in at least 16 trenches per grey level for a 1 cm long grating and a period of 600 nm.

In some instances, optical performance of the grating can be improved by exposing the resist to heat (i.e., reflow) such that the steps and roughness caused by the lithography is smoothed to some extent.

After the etching of FIGS. 1D, 1E, 1F is completed, and the trenches 20 for the grating are formed, the mask 12 can be removed. The grating can be configured to be used directly as an optical element (e.g., a transmissive grating made from silicon and configured to be operable in infra-red (IR)), or can be configured to be used as a master (e.g., tool or mold) and then used to replicate optical elements.

Figure 2:
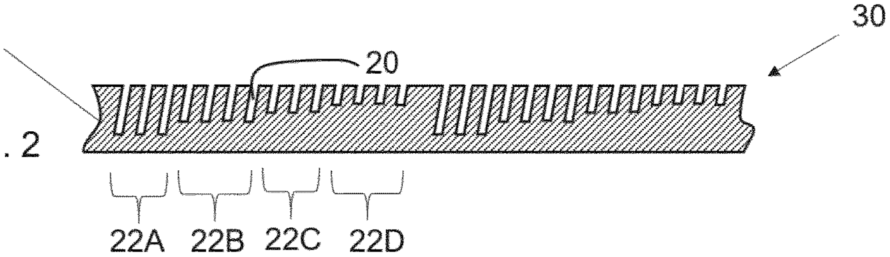
FIG. 2 shows an example of part of a master (e.g., tool or mold) made in accordance with the present disclosure.

That is, in some instances, the method results in a master (e.g., tool or mold) 30, as shown in FIG. 2, which can be used to form multiple optical elements (e.g., gratings) in a polymeric material, such as by replication. Replication refers to a technique by means of which a given structure is reproduced. In an example of a replication process, a structured surface is embossed into a liquid or plastically deformable material (a "replication material"), then the material is hardened, e.g., by curing using ultraviolet (UV) radiation or heating, and then the structured surface is removed. Thus, a negative of the structured surface (a replica) is obtained.

Figure 3:
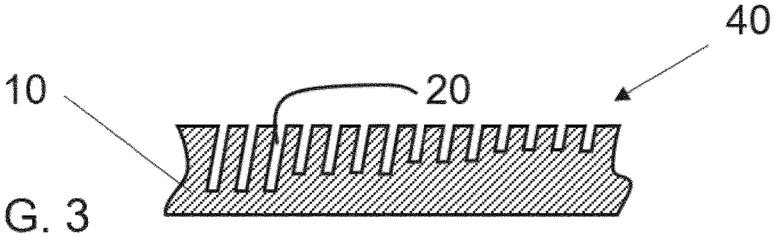
FIG. 3 shows an example of an optical element (e.g., grating) made in accordance with the present disclosure.

In other instances, as indicated by FIG. 3, after the mask 12 is removed, the substrate 10 is separated (e.g., by dicing) into individual optical elements (e.g., gratings) 40. An individual optical element (e.g., grating) 40 exhibits trench depths that vary such that the trenches can be grouped into multiple sections (e.g., 22A, 22B, 22C, 22D), each of which can contain multiple trenches 20 having substantially the same depth as the other trenches in the same section. Thus, as noted above, the slanted gratings made in accordance with the present techniques (i.e., using grey scale lithography) can exhibit a slope that is stepped (i.e., discontinuous).

Further, in some implementations, the grating 40 can exhibit trench depths that vary (e.g., increase and decrease) in multiple directions and at spatial distances that, in some cases, may be less than 100 um.

Thus, the techniques described in accordance with this disclosure can provide enhanced flexibility in the grating design compared, for example, to using a shutter technique to form slanted gratings, which typically results in a slope that is fixed in a particular direction and where the change in etch depth along the slope line is substantially continuous.

In some implementations, instead of coating the resist 16 directly on the grating mask 12 and the exposed parts 14 of the substrate surface, the grating mask 12 and the exposed parts 14 of the substrate surface are coated with an intermediate layer of another material (e.g., $SiO_2$), and then the resist is deposited onto the additional intermediate layer. As described in connection with the example of FIGS. 1A through 1F, the resist is contoured so as to form multiple discrete steps in its surface. The additional intermediate layer subsequently is etched, and then the grating is etched into the grating material.

FIGS. 4A through 4G, which are described in greater detail below, illustrate an example of this second method for fabricating slanted gratings using a grey-scale resist.

Figure 4A:
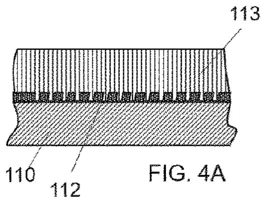
FIGS. 4A-4G illustrate a second method for fabricating slanted gratings using a grey-scale resist.

As shown in FIG. 4A, a grating mask 112 is deposited on the surface of a grating material substrate 110. The substrate 110 can be composed, for example, of silicon, although other materials may be used in some implementations. The mask 112 can be composed, for example, of $Al_2O_3$, although other materials may be used in some implementations. As in the example of FIGS. 1A-1F, the mask 112 serves to define where the trenches for the grating(s) are subsequently etched into the substrate 110. In this implementation, an additionally layer of material (e.g., $SiO_2$) 13 is deposited on the mask 112 and the exposed parts 114 of the substrate surface.

Figure 4B:
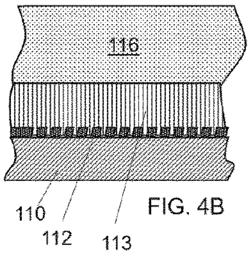

Next, as shown in FIG. 4B, a resist 116 that is capable of being contoured so as to form multiple discrete steps in its surface is deposited on the layer 113. Here as well, in some implementations, the resist 116 is an e-beam resist, whereas in other implementations, the resist 116 is a photoresist. Details of the resist and its application can be as described above in connection with the example of FIGS. 1A-1F.

Figure 4C:
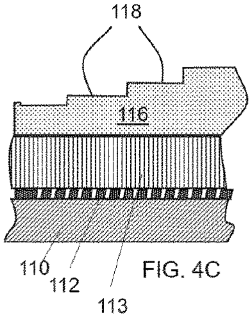

As shown in FIG. 4C, the resist 116 is contoured based on the desired grating structure. If the resist 116 is an e-beam resist, the resist 116 can be exposed to an e-beam and then developed to contour the resist. By varying the e-beam dose delivered to different regions across the surface of the resist 116, the resist 16 can be contoured such that there are discrete steps 118 formed in the surface of the resist 116. That is, the transition between adjacent steps 118 is non-continuous. If the resist 116 is a photoresist, a direct laser writer can be used to contour the photoresist. Here as well, using a laser writer to expose the photoresist, the resist can be contoured such that there are discrete steps formed in its surface (i.e., such that the transition between adjacent steps 118 is non-continuous).

Figure 4D:
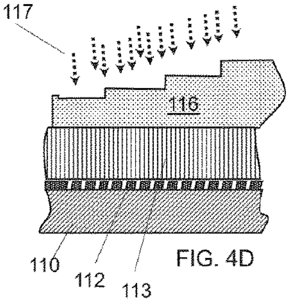

Next, as indicated by FIG. 4D, the layer 113 is etched, for example, using an $NF_3$-based etchant 117. As the etching proceeds, the resist 116, and then the intermediate layer 113, are etched. The layers 116, 113 can be etched at respective, substantially uniform rate so that the contour formed in the resist 116 is transferred to the intermediate layer 113. That is, as a result of the etching of FIG. 4D, there are discrete steps 121 formed in the surface of the layer 113 (i.e., such that the transition between adjacent steps is non-continuous). The profile of the contour formed in the intermediate layer 113 is substantially the same as or similar to the contour previously formed in the resist 116.

Figure 4E:
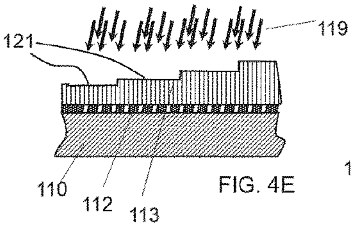
Figure 4F:
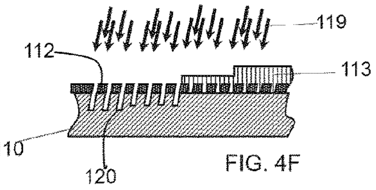
Figure 4G:
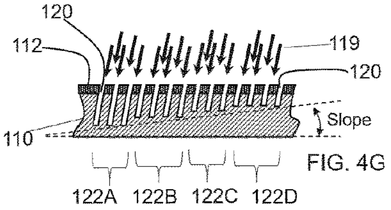

Next, as shown in FIGS. 4E, 4F, 4G, the grating structure is etched, for example, using reactive ion-beam etching. As the etching process proceeds, the layer 113 is etched at a substantially uniform rate by the ion beam 119. As the etching continues, the discrete (non-continuous) steps 121 are transferred into the grating material. The mask 112, however, is to some extent resistant to the etching. Thus, as the etching proceeds into the substrate 110 (FIGS. 4F and 4G), the presence of the mask 112 results in trenches 120 being formed in the substrate 110. The respective depths of the trenches 120 corresponds inversely to the height of the layer 113. That is, in an area 122A of the substrate 110 where there was a relatively thin layer of the layer 113 prior to the reactive ion-beam etching, the trenches 120 will be relatively deep. Conversely, in an area 122D of the substrate 110 where was a relatively thick layer of the layer 113 prior to the reactive ion-beam etching, the trenches 120 will be relatively shallow. Other areas 122B, 122C of the substrate 10 may have trenches 120 whose depth is intermediate between the depth of the trenches in areas 122A, 122D. The different depths correspond to the finite number of grey-scale steps created in the resist 116 (and subsequently in the layer 113) as a result of the greyscale e-beam or laser lithography in FIG. 1C (and the subsequent etching in FIG. 4D). The grey-scale steps corresponding to the different depths of the trenches can be contrasted with the substantially continuous slope that typically results, for example, using a shutter technique (see "slope" in FIG. 4G).

In some instances, optical performance of the grating can be improved by exposing the resist to heat (i.e., reflow) such that the steps and roughness caused by the lithography are smoothed to some extent.

After the etching of FIGS. 4E, 4F, 4G is completed, and the trenches 120 for the grating are formed, the mask 112 can be removed. The grating can be configured to be used directly as an optical element (e.g., a transmissive grating made from silicon and configured to be operable in infra-red (IR)), or can be configured to be used as a master (e.g., tool or mold) and then used to replicate optical elements. See FIGS. 2 and 3.

In some implementations, the techniques described in the present disclosure can give designers flexibility in their designs, which in some cases, can result in better control of the light output.

In some instances, a master can be used to replicate sub-masters, which in turn may be used to replicate the optical gratings. That is, optical grating devices can be replicated directly from the sub-master or from higher generation sub-masters.

Figure 5:
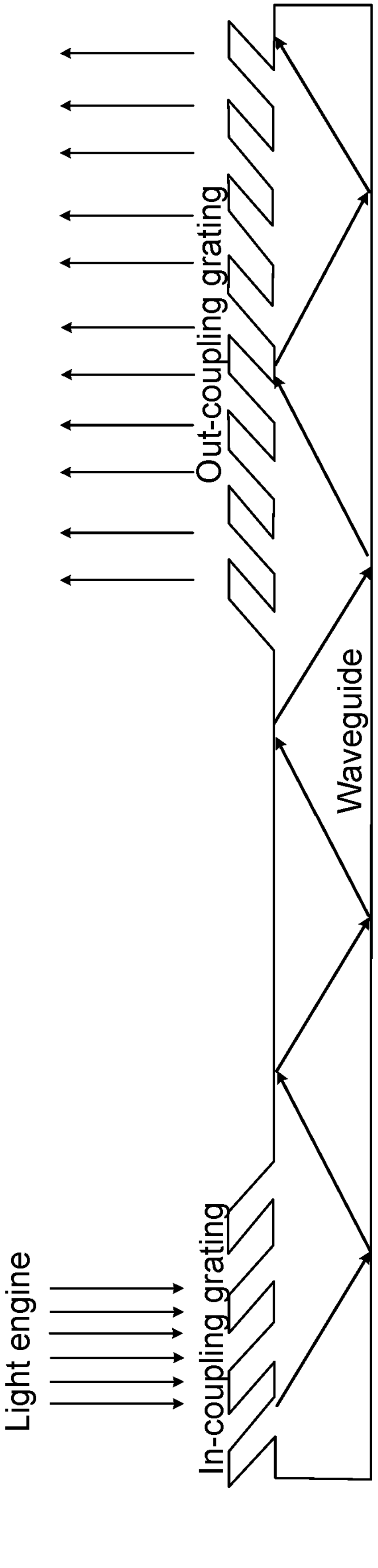
FIG. 5 illustrates an example application in which slanted gratings are integrated into a waveguide display.

FIG. 5 illustrates an example application in which slanted gratings are integrated into a waveguide display. In the illustrated example, light from a light source (e.g., a light engine) is directed, through a first in-coupling optical grating, into an optical waveguide. The light travels through the waveguide and exits through a second out-coupling optical grating.

Various modifications can be made within the spirit of the present disclosure. Accordingly, other implementations are within the scope of the claims.

What is claimed is:

1. A method of manufacturing an optical grating or a master for replicating optical gratings, the method comprising:

providing a substrate that has a substrate surface on which is disposed a grating mask;

depositing an intermediate layer on the grating mask and on portions of the substrate surface exposed by the grating mask;

depositing a resist layer on the intermediate layer, wherein the intermediate layer and the resist layer are composed of different materials;

processing the resist layer to have a contour that has a plurality of discrete, non-continuous steps in a surface of the resist layer, wherein a height of each step of the plurality of discrete, non-continuous steps is different, and wherein each step is associated with a different region of the substrate;

performing a first etch of the resist layer and the intermediate layer, to transfer the contour in the resist layer to the intermediate layer; and subsequently performing a second etch of the intermediate layer and the substrate, wherein etching the substrate forms a different respective plurality of trenches in each region of the substrate, wherein depths of the trenches for each respective region correspond to the discrete, non-continuous steps in the surface of the resist layer associated with the respective region, wherein the trenches in each particular one of the regions have substantially the same depth as one another, and wherein each particular one of the regions contains trenches having a depth that differs from a depth of the trenches in an adjacent region.

2. The method of claim 1 wherein the resist layer is composed of an e-beam resist, and wherein processing the resist layer includes exposing the resist layer using e-beam lithography.

3. The method of claim 2 wherein exposing the resist layer using e-beam lithography includes exposing different areas of the e-beam resist with different exposure doses.

4. The method of claim 2 wherein the second etch includes reactive ion beam etching.

5. The method of claim 1 wherein the resist layer is composed of a photoresist, and wherein processing the resist layer includes exposing the resist layer using a direct laser writer.

6. The method of claim 5 wherein exposing the resist layer using a direct laser writer includes exposing different areas of the photoresist to different exposure levels.

7. The method of claim 5 wherein the second etch includes reactive ion beam etching.

8. The method of claim 1 wherein the intermediate layer is composed of $SiO_2$, and wherein the resist layer is composed of an electron-beam resist or a photoresist.

9. The method of claim 1 wherein the first etch includes a $NF_3$-based etch, and wherein the second etch includes reactive ion beam etching.

10. The method of claim 1 wherein the substrate is composed of silicon.

11. The method of claim 10 further including:

using the substrate having the trenches therein as a master in a replication process to form at least one sub-master or optical grating.

12. The method of claim 1 further including:

separating the substrate into individual optical gratings, each of which has a plurality of slanted trenches.

13. The method of claim 1 further including:

using the substrate having the trenches therein as a master in a replication process to form at least one sub-master or optical grating.

14. The method of claim 1, comprising, after processing the resist layer to have the contour, performing a reflow process on the resist layer.

15. The method of claim 1, wherein the first etch is configured to etch the resist layer and the intermediate layer at a substantially uniform rate.

16. The method of claim 1, wherein the resist layer comprises a grey-scale resist, and wherein processing the resist layer to have the contour comprises delivering a defined number of multiple distinct grey-scale doses to the grey-scale resist.

17. The method of claim 1, wherein the first etch is configured to completely remove the resist layer, and wherein the second etch is configured to completely remove the intermediate layer.

* * * * *